United States Patent
Alvarez et al.

(10) Patent No.: US 12,020,441 B2
(45) Date of Patent: Jun. 25, 2024

(54) DEVICE AND METHOD FOR ESTIMATING THE MOVEMENT OF AN IMAGE SENSOR BETWEEN TWO IMAGES, AND ASSOCIATED COMPUTER PROGRAM

(71) Applicant: NAVAL GROUP, Paris (FR)

(72) Inventors: Félix Alvarez, Ollioules (FR); Dann Laneuville, Bouguenais (FR); Adrien Negre, Ollioules (FR)

(73) Assignee: NAVAL GROUP, Paris (FR)

( * ) Notice: Subject to any disclaimer, the term of this patent is extended or adjusted under 35 U.S.C. 154(b) by 477 days.

(21) Appl. No.: 17/312,892

(22) PCT Filed: Dec. 19, 2019

(86) PCT No.: PCT/EP2019/086366
§ 371 (c)(1),
(2) Date: Jun. 10, 2021

(87) PCT Pub. No.: WO2020/127774
PCT Pub. Date: Jun. 25, 2020

(65) Prior Publication Data
US 2022/0067947 A1  Mar. 3, 2022

(30) Foreign Application Priority Data
Dec. 21, 2018 (FR) ..................... 18 73758

(51) Int. Cl.
*G06K 9/00* (2022.01)
*G06T 7/20* (2017.01)

(52) U.S. Cl.
CPC ...... *G06T 7/20* (2013.01); *G06T 2207/20016* (2013.01); *G06T 2207/30244* (2013.01)

(58) Field of Classification Search
CPC ............. G06T 7/20; G06T 2207/10016; G06T 2207/20016; G06T 2207/30244;
(Continued)

(56) References Cited

U.S. PATENT DOCUMENTS

| 2006/0008116 A1* | 1/2006 | Kiraly | ....................... G06T 7/20 382/103 |
| 2009/0232216 A1* | 9/2009 | Kurata | .................... G06T 7/223 375/E7.076 |

FOREIGN PATENT DOCUMENTS

| FR | 2940492 A1 | 6/2010 |
| WO | WO 2010/070128 A1 | 6/2010 |

OTHER PUBLICATIONS

International Search Report and Written Opinion of the International Searching Authority for International Patent Application No. PCT/EP2019/086366, dated Feb. 7, 2020, in 11 pages.

(Continued)

*Primary Examiner* — Duy M Dang
(74) *Attorney, Agent, or Firm* — Knobbe, Martens, Olson & Bear, LLP

(57) ABSTRACT

A method of estimating the movement between two images ($I_1$, $I_2$) comprising the steps of determining an initialization displacement vector between the two images by projecting, in the image plane of the image capture device, the displacement between the two images calculated depending on collected information defining the movement of the image capture device between the two images and depending on the value of image capture parameter(s) used, chosen from an angular opening, a zoom factor and the resolution of the images implementing, based on the initialization displacement vector, an iterative algorithm delivering a displacement vector depending on an error function to be minimized between one of the two images and the transform of the other image by the displacement vector.

6 Claims, 8 Drawing Sheets

(58) Field of Classification Search
CPC ......... G06T 7/207; G06T 7/231; G06T 7/254; G06T 7/246; G06T 7/215; G06F 16/786; A61B 2034/2057; A61B 2034/2065
See application file for complete search history.

(56) References Cited

OTHER PUBLICATIONS

English translation of International Search Report of the International Searching Authority for International Patent Application No. PCT/EP2019/086366, dated Feb. 7, 2020, in 3 pages.
Search Report for French Patent Application No. FR 1873758, dated Nov. 19, 2019, in 3 pages.
He et al., "Fast global motion estimation for global motion compensation coding," Conference Proceedings / ISCAS 2001, The 2001 IEEE International Symposium on Circuits and Systems: May 6-9, 2001, Sydney Convention and Exhibition Centre, Darling Harbour, Sydney, Australia, IEEE Service Center, Piscataway, NJ, vol. 2, pp. 233-236 (May 6, 2001).
Jiang et al., "Motion-Compensated Frame Prediction with Global Motion Estimation for Image Sequence Compression," Canadian Conference On Electrical and Computer Engineering 2007 (CCECE 2007), IEEE, Pi, pp. 1468-1471, Apr. 1, 2007.
Merzban et al., "Toward multi-stage decoupled visual SLAM system," 2013 IEEE International Symposium on Robotic and Sensors Environments (Rose), IEEE, pp. 172-177 (Oct. 21, 2013).

* cited by examiner

DEVICE AND METHOD FOR ESTIMATING THE MOVEMENT OF AN IMAGE SENSOR BETWEEN TWO IMAGES, AND ASSOCIATED COMPUTER PROGRAM

CROSS-REFERENCE TO RELATED APPLICATIONS

This application is the U.S. National Phase under 35 U.S.C. § 371 of International Application No. PCT/EP2019/086366, filed Dec. 19, 2019, titled DEVICE AND METHOD FOR ESTIMATING THE MOVEMENT OF AN IMAGE SENSOR BETWEEN TWO IMAGES, AND ASSOCIATED COMPUTER PROGRAM, which claims priority to FR Patent Application No. 18 73758, filed Dec. 21, 2018, the entirety of each of which is hereby expressly incorporated by reference herein.

SUMMARY

The present invention relates to a method for estimating the movement of an image sensor between two images captured by this sensor.

In the field of video processing, many methods for digital image stabilization, for detecting moving objects in onboard cameras, for constructing blindfolds, for determining the trajectory of objects, etc., use such methods for estimating movement between two images, generally comprising the estimation of a vector, known as the displacement vector, defining the movement of the camera between two consecutive images; such a vector is composed, for example, of the parameters of a model of displacement between the two images.

Very often, these methods of calculating displacement flows minimize an error function in an iterative way, starting from a displacement vector with a given initialization value, and thus propose, over the iterations, displacement vectors that are closer and closer to a minimum of this error function (assuming that this local minimum corresponds to the true displacement vector). The iterative methods used are typically those of the Newton or Gauss-Newton type or gradient descent.

These methods have several problems. If the initial displacement vector is too far away, in the sense of the Euclidean norm, from the true displacement, the method does not converge and produces an unusable result. A second problem, a direct consequence of the first, is that, as the initial vector must not be too far from the true vector, the amplitudes of the displacements between images that can be estimated are limited. A third problem is that there is no guarantee, in general, that the error function to be minimized is convex: the algorithm may therefore converge to a local minimum far from the true solution. Finally, the convergence of these methods may require many iterations, costly in computation time (and resources), which is problematic in real time applications.

The aim of the invention is to propose a solution that helps to reduce these problems.

To this end, according to a first aspect, the invention relates to a method for estimating the movement between two images implemented by an electronic processing device, said images being captured using an image capture device, said method comprising the steps of:

collecting data defining each of the two images;

determining an initialization displacement vector characterizing a displacement between said two images; and implementing, based on the initialization displacement vector, an iterative algorithm providing at each iteration an updated displacement vector depending on an error function to be minimized between one of the two images and the transform of the other image by a displacement defined by the updated displacement vector, said method being characterized in that it comprises the steps of:

collecting information defining the movement of the image capture device between the two images;

collecting the value of capture parameter(s) of the image capture device used for capturing the two images chosen from an angular opening, a zoom factor and the resolution of the images; and determining the initialization displacement vector by projecting, in the image plane of the image capture device, the displacement between the two images calculated depending on the collected information defining the movement of the image capture device between the two images and depending on the value of each capture parameter.

The invention thus makes it possible to use the camera parameterization information as well as the camera position and orientation information from an inertial unit coupled to the camera in order to propose a first displacement vector $X_0$ close to the true vector. This improves overall performance by increasing the probability of converging towards the true displacement. In particular, this improves the accuracy of the provided solution and enables estimating larger displacements between images. Further, using a first displacement vector $X_0$ close to the true one results in a decrease in the number of iterations and will also accelerate convergence while naturally reducing computation time and resources.

In embodiments, the method for estimating movement according to the invention further comprises one or more of the following features:

the information defining the movement of the image capture device between the two images is provided by a movement determination device attached to the image capture device;

the initialization displacement vector is taken to be equal to $X_0^{opt}=(a_1^{opt},a_2^{opt},a_3^{opt},a_4^{opt},a_5^{opt},a_6^{opt})^T$, where $$\begin{cases} a_1^{opt} = \dfrac{\left(\dfrac{W-1}{2}\left(1 + \dfrac{\tan(\psi)}{\tan\left(\dfrac{\alpha_\psi}{2}\right)} - s \times \cos(\varphi)\right) + \dfrac{H-1}{2} s \times \sin(\varphi)\right)}{2^{L-1}} \\ a_2^{opt} = s \times \cos(\varphi) - 1 \\ a_3^{opt} = -s \times \sin(\varphi) \\ a_4^{opt} = \dfrac{\left(\tan(\theta) \times \sqrt{\dfrac{(H-1)^2}{4\tan\left(\dfrac{\alpha_\theta}{2}\right)^2} + \dfrac{(W-1)^2}{4}\dfrac{\tan(\psi)^2}{\tan\left(\dfrac{\alpha_\psi}{2}\right)^2}} - \dfrac{W-1}{2} s \times \sin(\varphi) + \dfrac{H-1}{2}(1 - s \times \cos(\varphi))\right)}{2^{L-1}} \\ a_5^{opt} = s \times \sin(\varphi) \\ a_6^{opt} = s \times \cos(\varphi) - 1 \end{cases}$$

where L is the number of levels of a successive image resolution reduction pyramid in the case of a multi-resolution method for estimating movement or, otherwise, is equal to 1; $(\psi, \theta, \varphi,)$ are the Euler angles indicated by the collected information, $\varphi$ further representing the rotation of the camera about its line of sight, the images having W pixels in width and H pixels in height.

According to a second aspect, the present invention provides an electronic device for the estimation of movement between two images comprising an input for collecting data defining each of the two images and being adapted to determine an initialization displacement vector characterizing a displacement between said two images and for implementing, based on the initialization displacement vector, an iterative algorithm delivering at each iteration an updated displacement vector depending on an error function to be minimized between one of the two images and the transform of the other image by a displacement defined by the updated displacement vector, said device being characterized in that it is adapted to collect information defining the movement of the image capture device between the two images, to collect the value of capture parameter(s) of an image capture device used for capturing the two images among an angular opening a zoom factor and the resolution of the images and to determine the initialization displacement vector by projecting, in the image plane of the image capture device, the displacement between the two images calculated depending on the collected information defining the movement of the image capture device between the two images and depending on the value of each capture parameter.

In one embodiment, said device is adapted to take the initialization displacement vector to be equal to $X_0^{opt} = (a_1^{opt}, a_2^{opt}, a_3^{opt}, a_4^{opt}, a_5^{opt}, a_6^{opt})^T$, where $$\begin{cases} a_1^{opt} = \dfrac{\left(\dfrac{W-1}{2}\left(1 + \dfrac{\tan(\psi)}{\tan\left(\dfrac{\alpha_\psi}{2}\right)} - s \times \cos(\varphi)\right) + \dfrac{H-1}{2} s \times \sin(\varphi)\right)}{2^{L-1}} \\ a_2^{opt} = s \times \cos(\varphi) - 1 \\ a_3^{opt} = -s \times \sin(\varphi) \\ a_4^{opt} = \dfrac{\left(\tan(\theta) \times \sqrt{\dfrac{(H-1)^2}{4\tan\left(\dfrac{\alpha_\theta}{2}\right)^2} + \dfrac{(W-1)^2}{4}\dfrac{\tan(\psi)^2}{\tan\left(\dfrac{\alpha_\psi}{2}\right)^2}} - \dfrac{W-1}{2} s \times \sin(\varphi) + \dfrac{H-1}{2}(1 - s \times \cos(\varphi))\right)}{2^{L-1}} \\ a_5^{opt} = s \times \sin(\varphi) \\ a_6^{opt} = s \times \cos(\varphi) - 1 \end{cases}$$

where L is the number of levels of a successive image resolution reduction pyramid in the case of a multi-resolution the movement estimation method or, otherwise, is equal to 1; $(\psi, \theta, \varphi,)$ are the Euler angles indicated by the collected information, $\varphi$ further representing the rotation of the camera about its line of sight, the images having W pixels in width and H pixels in height.

According to a third aspect, the present invention provides a computer program comprising software instructions which, when executed by a computer, implement a method as defined above.

BRIEF DESCRIPTION OF THE DRAWINGS

These features and advantages of the invention will become apparent from the following description, given by way of example only, and made with reference to the attached drawings, in which.

DETAILED DESCRIPTION

Figure 2:
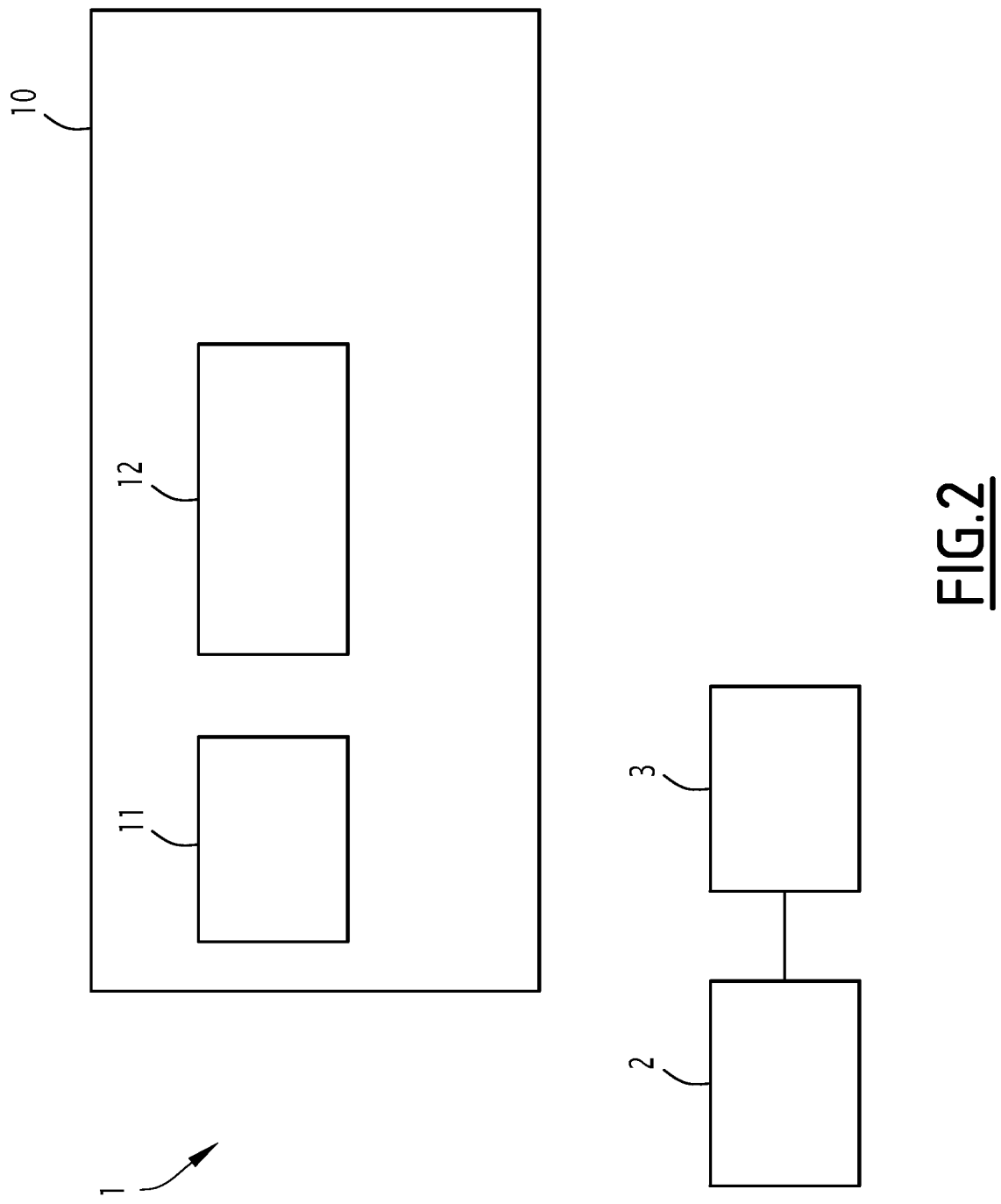
FIG. 2 is a view of an image processing system in one embodiment of the invention.

FIG. 2 is a schematic view of an image processing system 1 in one embodiment of the invention. The image processing system 1 comprises an electronic movement estimation device 10, an image capture block 2 and a movement determination unit 3, adapted to determine camera movements.

In this case, the image capture block 2 is a camera 2 and the movement determination unit 3 is a central inertial unit 3 attached to the camera 2 (for example, a mini central inertial unit).

The camera 2 comprises a means for setting image capture parameters, for setting the value of the parameters for the capture of each image (setting a given parameter to one of several proposed values is carried out automatically, for example, and/or according to values entered by an operator from a man/machine interface of the camera). These parameters comprise, for example, one or more camera angular opening parameter(s) and/or a zoom factor used for image capture and resolution.

The camera 2 is adapted to output each captured image to the electronic movement estimation device 10, in the form of image data (for example, an intensity value associated with each pixel of a pixel matrix), associated with the value taken by each image capture parameter during the capture of that image.

The inertial unit 3 comprises:
three gyrometers measuring the three components of the angular velocity vector (rates of change of roll, pitch, and yaw angles); and
three accelerometers measuring the three components of the specific force vector (the specific force is the sum of the external forces other than the gravitational, divided by the mass)

The inertial unit 3 also includes a computer (not shown) adapted to determine by real time integration, from the successive measurements of these six sensors, the position of the camera 2 (for example, the position of a particular point of camera 2) and its orientation (for example the Euler angles giving the attitude: roll, pitch and heading) with respect to a reference frame. The inertial unit 3 is adapted to deliver this position and orientation information to the electronic the movement estimation device 10.

As a reminder, the attitude of a rigid body, here the camera 2, is defined by the way the latter is oriented. In general, to express an attitude, two reference frames are considered: a fix reference frame, noted N, with axes X, Y, Z, and a mobile frame, attached to the body, noted B, with axes $X_G$, $Y_G$, $Z_G$.

To properly express the attitude, the axes of reference frame B are chosen to be aligned with the main axes of inertia of the rigid body defining its rotation. A fixed reference frame often used is one that is tangent to the earth's surface and defined according to the NED (North, East, Down) convention, according to which the block vectors (X, Y, Z) point to the North, East, and gravitational (gravity) directions respectively. The orientation, corresponding to the passage from the reference frame N to the reference frame B linked to the body, can be described using a succession of three elementary rotations about the three axes of the reference frame, X, Y, Z respectively, and defined by the Euler angles $\psi$, $\theta$, $\varphi$ respectively.

In the considered embodiment, the camera 2, respectively the inertial unit 3, is connected to the movement estimation device 10 by a telecommunication link, for example a radio communication link in one embodiment.

Figure 1:
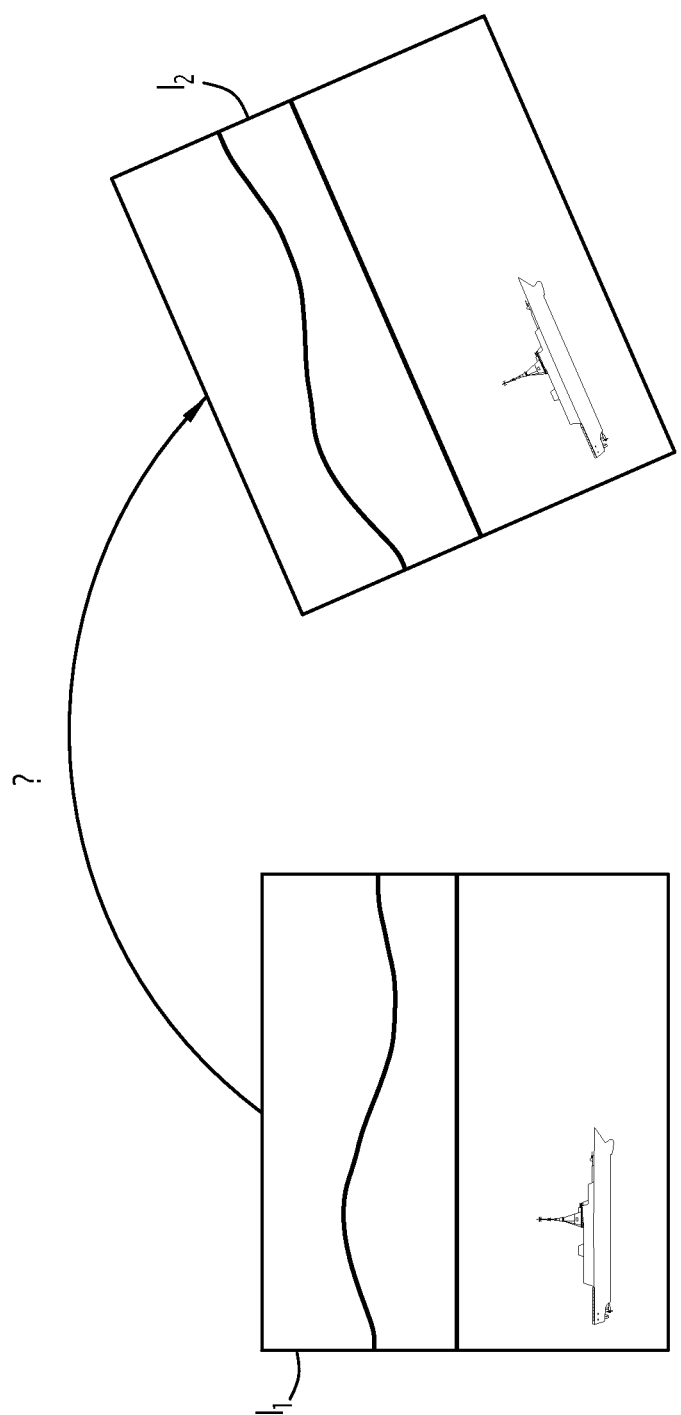
FIG. 1 represents two successive images $I_1$, $I_2$ captured by a camera in one embodiment of the invention.

The movement estimation device 10 is adapted to estimate the displacement of the camera 3 between two images $I_1$, $I_2$ as captured by the camera 2 and represented in FIG. 1, by implementing an iterative method.

It will be noted here that the inaccuracies of the position and orientation information provided by the inertial unit 3 do not allow the problem to be addressed directly and that the iterative image processing step is necessary to obtain the desired level of accuracy in estimating the displacement, a level of accuracy higher than that provided by the position and orientation information provided by the inertial unit 3.

Figure 3:
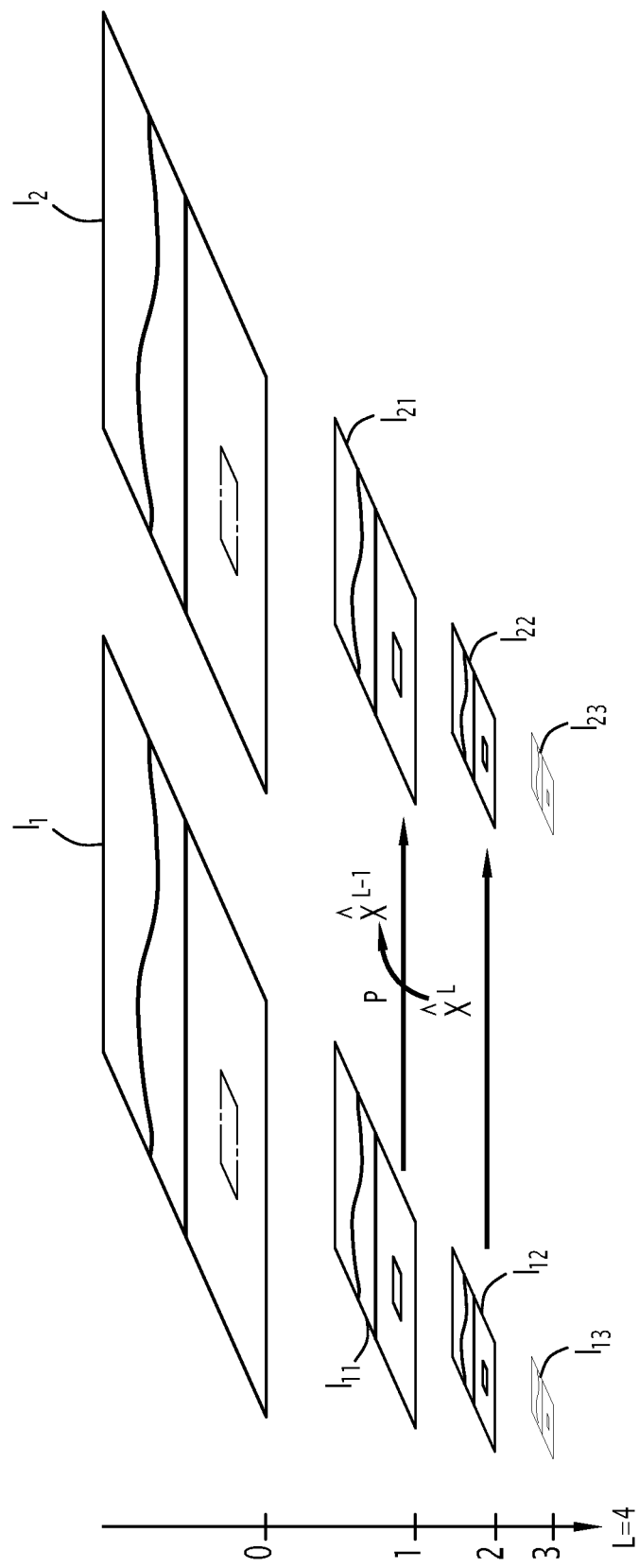
FIG. 3 is a view of image pyramids in one multi-resolution embodiment of the invention.

The iterative estimation method is for example (in existing solutions) inserted in a multi-resolution scheme where the dimensions of the images are reduced by 2×2 (an inverted pyramid of images is obtained), at L−1 times, until small images are obtained where the choice (again in standard methods) of a first displacement vector $X_0$ equal to the null vector is assumed to be close to the true vector, where L is an integer greater than or equal to 1. FIG. 3 illustrates a 4-level image pyramid.

In the considered embodiment, the electronic the movement estimation device 10 includes a collection interface 11 and an electronic processing block 12.

Figure 4:
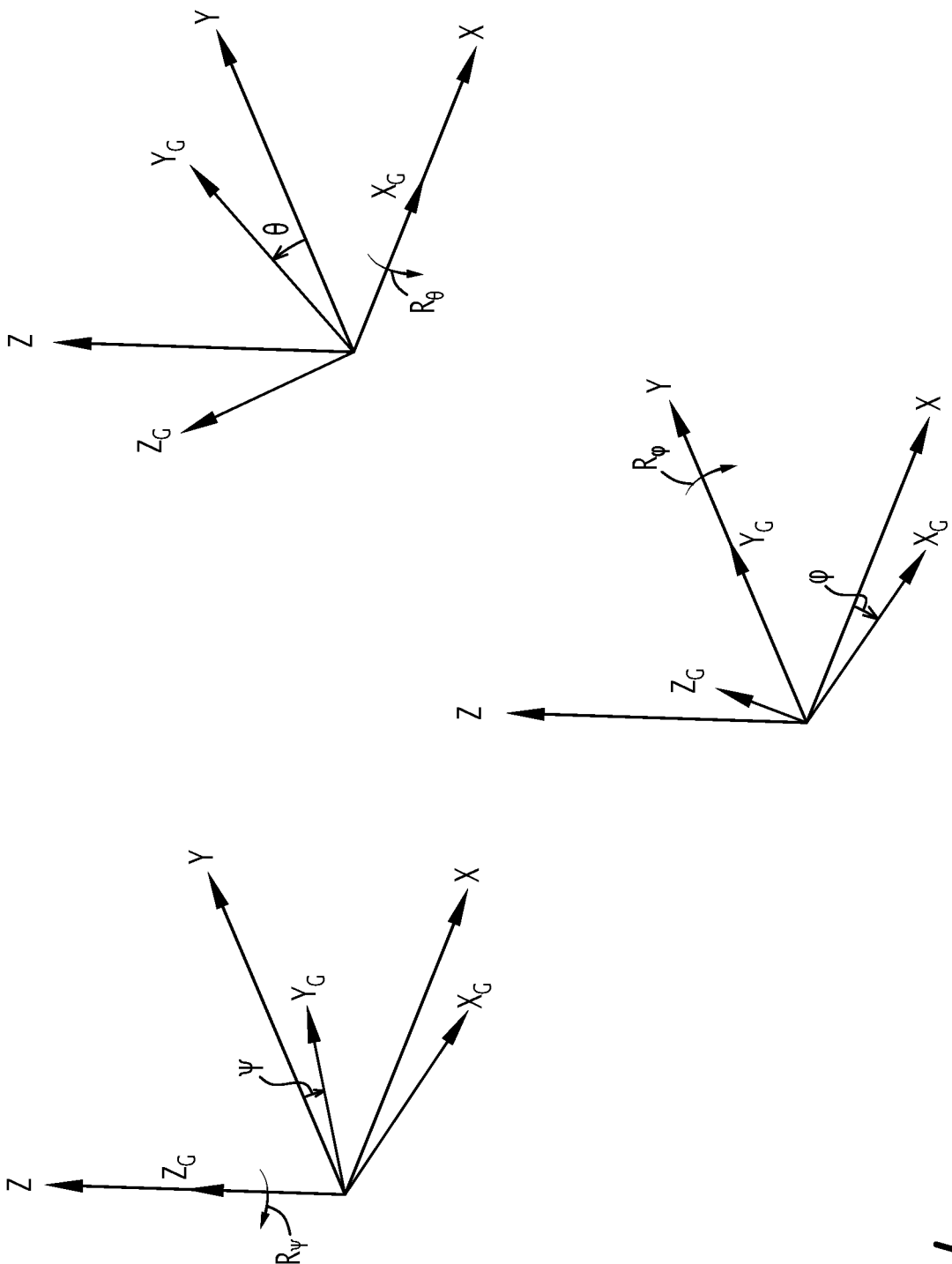
FIG. 4 illustrates the Euler angles used in one embodiment of the invention.

The collection interface 11 is adapted to collect the data of each image, for example $I_1$, $I_2$, as well as for each image, the values of the parameters of the camera 2 delivered by the camera 2 as well as the information of position and orientation delivered by the inertial unit 3 corresponding to the time of capture of this image. The three angles of Euler ($\psi$, $\theta$, $\varphi$) of displacement of the camera between the taking of the images $I_1$ and $I_2$ as represented in FIG. 4 are thus provided in the considered case.

In one embodiment, the movement estimation device 10 is adapted to implement the steps described with reference to FIG. 8.

In one embodiment, the processing block 12 includes a memory and a microcomputer (not shown), the memory storing software instructions that, when executed on the microcomputer, implement the steps described with reference to FIG. 8.

Thus, when a new image is collected, the processing block 12 retrieves the information from the camera 2 (angular openings, zoom factor, . . . ) and the corresponding information from the inertial unit 3. This information, compared with that of the previous image, makes it possible to estimate the displacement of the camera between the moments of capture of the two images, to project this displacement in the image plane of the camera 2 (and at the lowest level of the inverted pyramid in the case of a multi-resolution scheme) and thus to obtain an initialization displacement vector $X_0$. These operations are described in more detail below.

Figure 8:
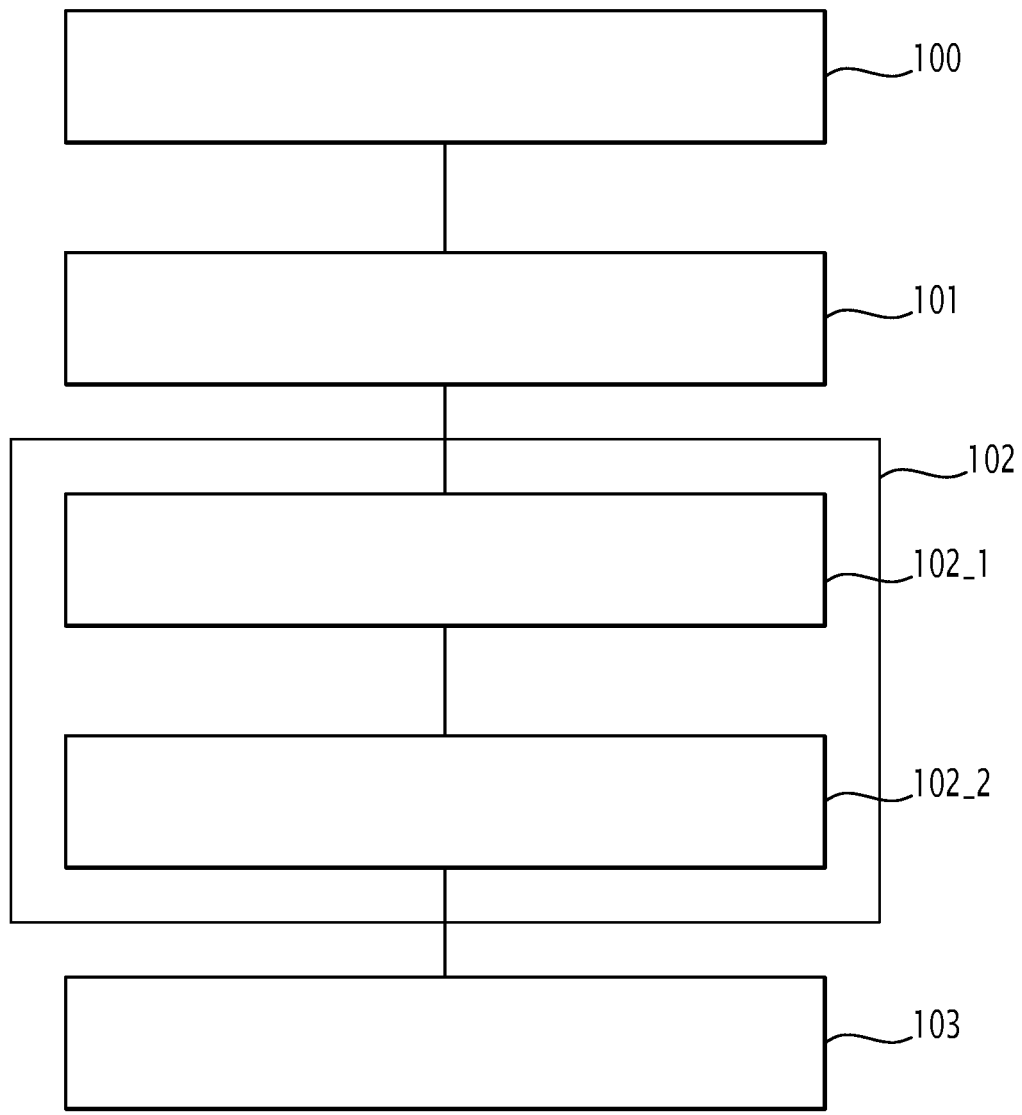
FIG. 8 is a flowchart of steps implemented in one embodiment of the invention.

With reference to FIG. 8, in a collection step 100, the collection interface 11 collects the image data $I_1$, then $I_2$, as well as for each image, the values of the parameters of the camera 2 and the position and orientation information and provides them to the processing block 12.

In a step 101 of implementation of the multi-resolution scheme, two Gaussian pyramids, each with a maximum level equal to L (L in the case under consideration equal to 4) will thus be calculated for the two images $I_1$ and $I_2$, as shown in FIG. 3. The choice of the level L depends mainly on the resolution of the two images (identical in this case).

In order to understand the contribution of the proposed solution, let us start by recalling how a method of the movement estimation between two images (of the same resolution) works.

Let us consider two images $I_1$ and $I_2$, the goal is to estimate the displacement between these two images as shown in FIG. 1.

To estimate this displacement movement, a displacement model or transformation T between these two images is used and the objective is to estimate the parameters of this displacement model. This displacement model or transformation will give for each pixel) $(i_1,j_1)$ of the image $I_1$, the displacement vector or displacement flow (u, v) to apply to reach the corresponding pixel $(i_2, j_2)$ of the image $I_2$. The displacement model used is defined by:

$$\begin{pmatrix} u(i_1, j_1) \\ v(i_1, j_1) \end{pmatrix} = \begin{pmatrix} a_1 \\ a_4 \end{pmatrix} + \begin{pmatrix} a_2 & a_3 \\ a_5 & a_6 \end{pmatrix} \begin{pmatrix} i_1 \\ j_1 \end{pmatrix}. \quad \text{(Formula 1)}$$

It is an affine transformation of coefficients vector $X=(a_1, a_2, a_3, a_4, a_5, a_6)^T$ allowing transformations between images to be taken into account such as translation, zoom, rotation, etc.

The coordinates of the pixel $(i_2, j_2)$ in the image $I_2$ corresponding to the pixel $(i_1, j_1)$ in the image $I_1$ are obtained by the following formulas.

$$\begin{cases} i_2 = i_1 + u(i_1, j_1) \\ j_2 = j_1 + v(i_1, j_1) \end{cases}.$$

The objective will be at each level n considered successively starting from the largest level (corresponding to the smallest images, i.e. at n=L−1) to the smallest level (n=0), to estimate the transformation parameters $X=(a_1,a_2,a_3,a_4,a_5,a_6)^T$ between the two images $I_1$, $I_2$ considered in their resolution corresponding to the level n, by minimizing (i.e. by bringing down below a predefined threshold of maximum acceptable error) a sum of squared errors of the following form, where p is some function that can be the identity or a function making the estimation robust to outliers, this sum representing a global error between the "true" displacement and the estimated displacement between the two images:

$$\sum_{(i_1, j_1)} \rho(I_1(i_1, j_1) - I_2(i_1 + u(i_1, j_1), j_1 + v(i_1, j_1)))^2. \quad (1)$$

This minimization problem is solved by using a recursive method, for example of the Gauss-Newton type, starting, according to the invention, from an initial value of the coefficient vector. This initial value of the vector of coefficients, or initialization value, is noted $X_0^{opt}$ for the largest level n (n=L−1) and noted $X_{0\_n}$ for each of the other levels n.

An iterative set 102 of steps is implemented, for each level n of the pyramid, starting at the highest level of the inverted pyramid (where the images are the smallest: i.e. We consider the smallest image of the pyramid of and the smallest image of the pyramid of $I_2$), in this case corresponding to the level n=3: for each level n, recursive calculations, for example according to the Gauss-Newton method, will thus be launched, with a respective initial estimate for the level n to estimate the displacement between the level n image of the pyramid of $I_1$ and the level n image of the pyramid of $I_2$.

In the implementation of the set 102 of steps for n=L−1, i.e., to estimate the displacement between the smallest image of the pyramid of $I_1$ and the smallest image of the pyramid of $I_2$, the parameters of the camera 2 and the information of the inertial unit 3 associated therewith are used to compute the initialization value of the coefficient vector $X_0^{opt}$.

It is also considered in the particular embodiment that the reference frame of the inertial unit 3 is aligned with the camera's viewing axis 2 in such a way that the rotation corresponds to the rotation of the image plane around its center.

Let us consider that the values of parameters provided by the camera 2 indicate between the two images $I_1$ and $I_2$ zoom factor noted s. Let us note $a_\psi$ the angular opening in azimuth of the camera and $a_\theta$ the opening in elevation, which indicate the variations of opening between the two images. This angular opening information is provided by the camera 2 in step 100. The images produced have pixels in width and pixels in height.

Figure 5:
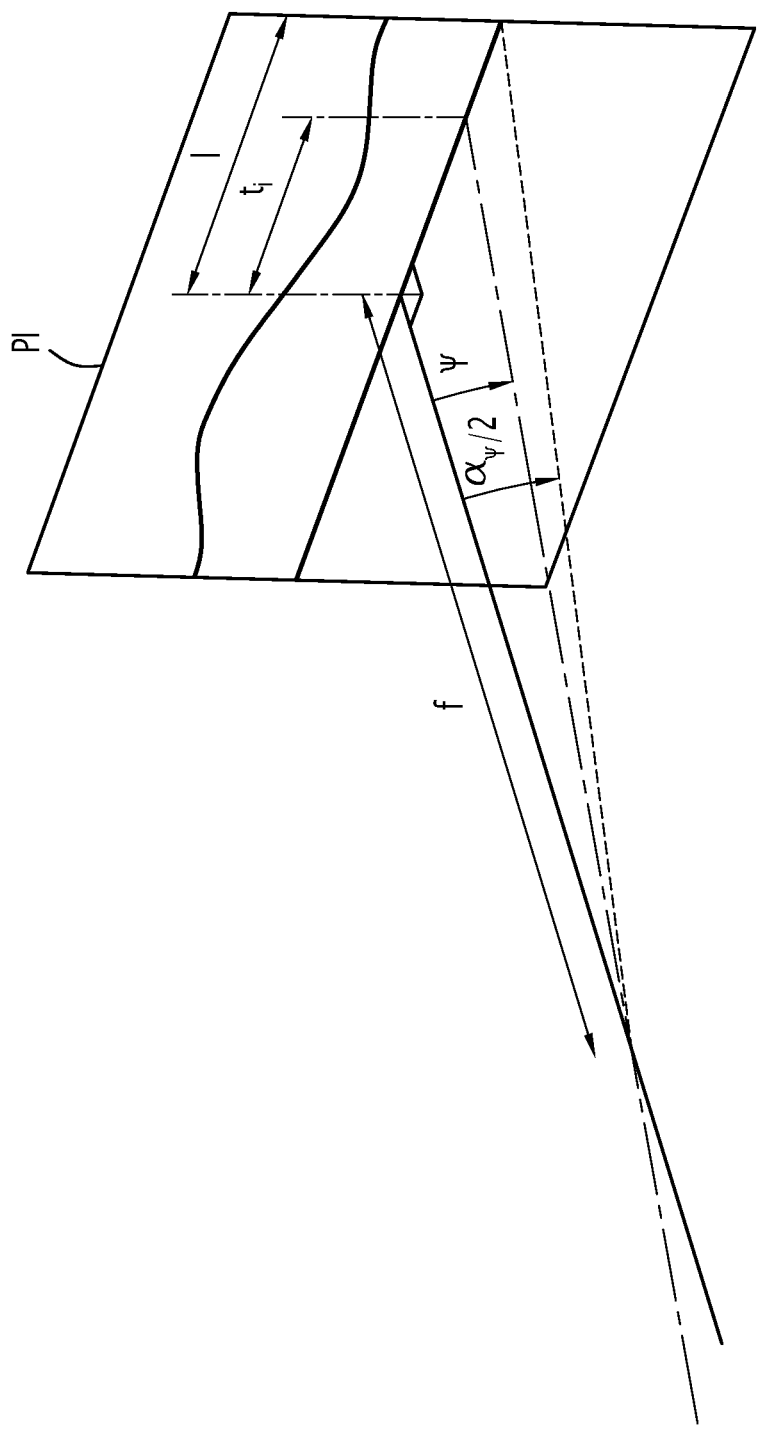
FIGS. 5, 6 and 7 illustrate the transformations with respect to the image plane in one embodiment of the invention.
Figure 6:
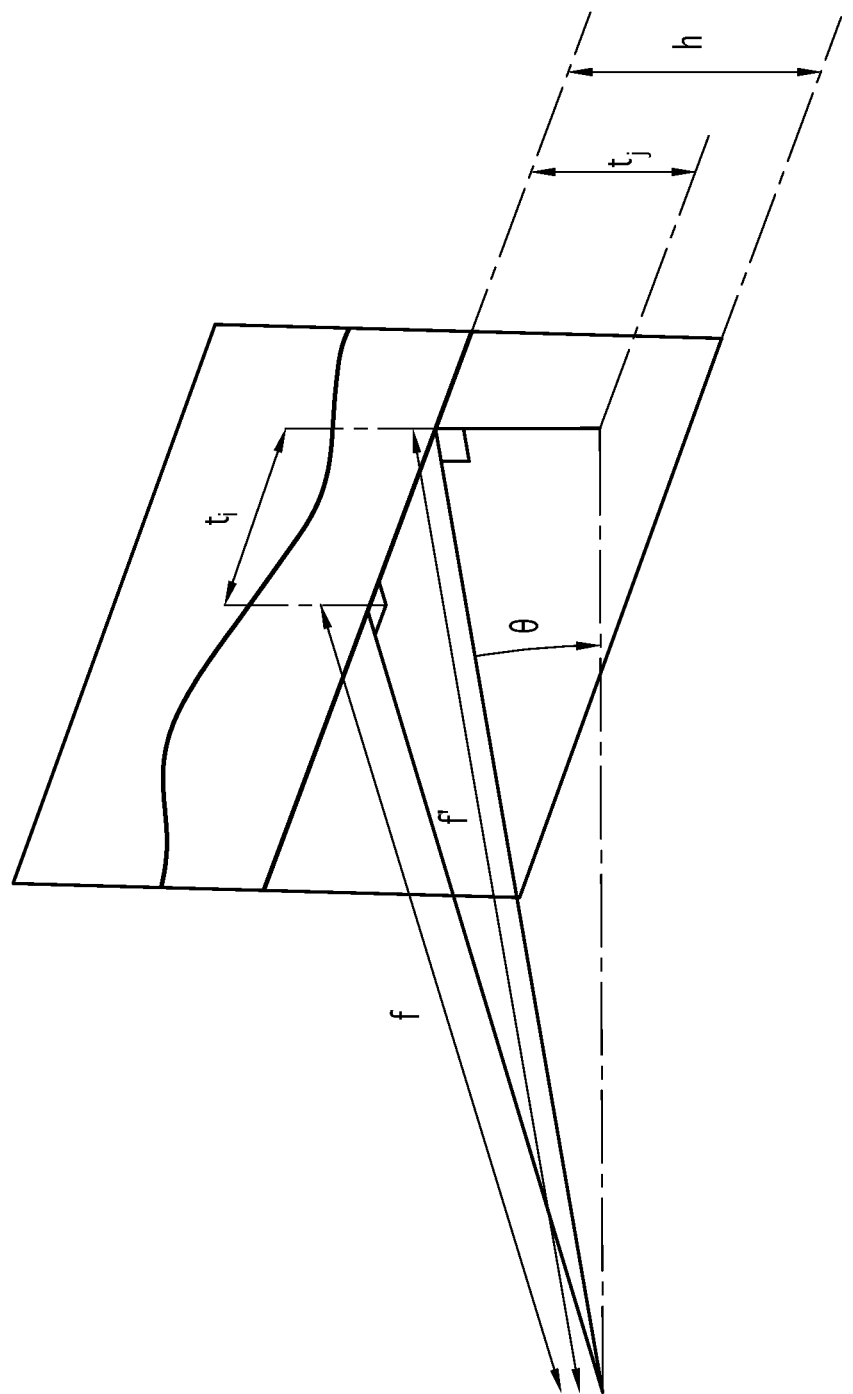
Figure 7:
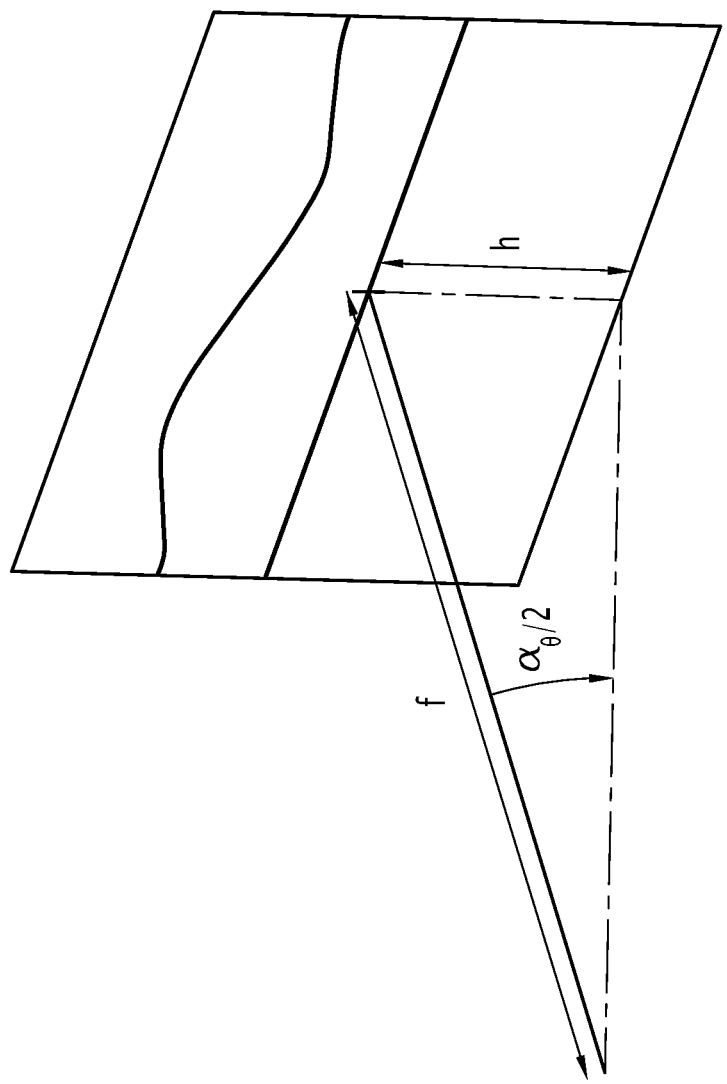

The translations $t_i$ and $t_j$ generated in the image plane PI by the rotations $\psi$ and $\theta$ of the camera 2 are shown in FIGS. 5 to 7.

With reference to FIG. 5, we have $$t_i = \tan(\psi) \times f,$$

where f is the focal length of the camera 2. Yet, $$f = \frac{l}{\tan\left(\frac{\alpha_\psi}{2}\right)},$$

where l is the horizontal distance between the center of the image and the right edge (see FIG. 5)

hence $$t_i = l \times \frac{\tan(\psi)}{\tan\left(\frac{\alpha_\psi}{2}\right)},$$

passing in the image plane with lengths in pixels, we finally obtain:

$$t_i = \frac{W-1}{2} \times \frac{\tan(\psi)}{\tan\left(\frac{\alpha_\psi}{2}\right)}.$$

$t_j$, with reference to FIGS. 6 and 7, can be calculated as follows (see also FIG. 5);

$$t_j = \tan(\theta) \times f' = \tan(\theta) \sqrt{f^2 + t_i^2}.$$

Yet $$f = \frac{h}{\tan\left(\frac{\alpha_\psi}{2}\right)},$$

thus, $$t_j = \tan(\theta) \sqrt{\frac{h^2}{\tan\left(\frac{\alpha_\psi}{2}\right)} + t_i^2}.$$

Passing in the image plane with lengths in pixels, it follows that:

$$t_j = \tan(\theta) \times \sqrt{\frac{(H-1)^2}{4\tan^2\left(\frac{\alpha_\theta}{2}\right)^2} + \frac{(W-1)^2}{4} \frac{\tan^2(\psi)}{\tan^2\left(\frac{\alpha_\psi}{2}\right)}}.$$

It will be detailed later how this translation generated by the angles $\psi$ and $\theta$ is taken into account in the calculation of $X_0^{opt}$.

Let us now look at the transformation generated in the image plane by the last Euler angle $\varphi$ and the change in zoom of camera 2.

The line of sight of the camera 2 and the inertial unit 3 are assumed to be calibrated so that the rotation of the camera 2 around its line of sight is represented. Under these conditions, the rotation in the image plane generated by $\varphi$ is represented by the following matrix:

$$\begin{pmatrix} \cos(\varphi) & -\sin(\varphi) \\ \sin(\varphi) & \cos(\varphi) \end{pmatrix}.$$

The change of scale created by the zoom of camera 2 is represented by the following matrix:

$$\begin{pmatrix} s & 0 \\ 0 & s \end{pmatrix}.$$

The transformation generated by $\varphi$ and the change of zoom is represented by the composition of the two previous matrices.

$$\begin{pmatrix} s \times \cos(\varphi) & -s \times \sin(\varphi) \\ s \times \sin(\varphi) & s \times \cos(\varphi) \end{pmatrix}.$$

This concerns the geometric transformation and not a displacement flow. To obtain the affine displacement flow from this transformation, it is necessary to subtract the position i,j, which is the position of each pixel considered, from the image I1 with i integer between 0 and W−1 and j between 0 and H−1. The flow generated by the preceding transformation which is a composition of a rotation and a zoom then amounts to:

$$\begin{pmatrix} \frac{W-1}{2} \\ \frac{H-1}{2} \end{pmatrix} + \begin{pmatrix} s \times \cos(\varphi) & -s \times \sin(\varphi) \\ s \times \sin(\varphi) & s \times \cos(\varphi) \end{pmatrix} \begin{pmatrix} i - \frac{W-1}{2} \\ j - \frac{H-1}{2} \end{pmatrix} - \begin{pmatrix} i \\ j \end{pmatrix}.$$

We add (W−1)/2 and (H−1)/2 and subtract (W−1)/2 to i and (H−1)/2 to j in the first two terms because the rotation and the zoom are expressed with respect to the center of the image which is at the point of coordinates ((W−1)/2, (H−1)/2). By expanding the previous expression, we get:

$$\begin{pmatrix} \frac{W-1}{2} + i \times s \times \cos(\varphi) - \frac{W-1}{2} s \times \cos(\varphi) - j \times s \times \sin(\varphi) + \frac{H-1}{2} s \times \sin(\varphi) - i \\ \frac{H-1}{2} + i \times s \times \sin(\varphi) - \frac{W-1}{2} s \times \sin(\varphi) + j \times s \times \cos(\varphi) - \frac{H-1}{2} s \times \cos(\varphi) - j \end{pmatrix}$$

By rearranging the terms, we get:

$$\begin{pmatrix} \frac{W-1}{2} - s \times \cos(\varphi) \frac{W-1}{2} + s \times \sin(\varphi) \frac{H-1}{2} \\ \frac{H-1}{2} - s \times \sin(\varphi) \frac{W-1}{2} - s \times \cos(\varphi) \frac{H-1}{2} \end{pmatrix} +$$

$$\begin{pmatrix} s \times \cos(\varphi) - 1 & -s \times \sin(\varphi) \\ s \times \sin(\varphi) & s \times \cos(\varphi) - 1 \end{pmatrix} \begin{pmatrix} i \\ j \end{pmatrix}.$$

By adding to this displacement flow the translation generated by the two rotation angles $\psi$ and $\theta$, the following total displacement flow is obtained.

$$\begin{pmatrix} t_i + \frac{W-1}{2} - s \times \cos(\varphi) \frac{W-1}{2} + s \times \sin(\varphi) \frac{H-1}{2} \\ t_j + \frac{H-1}{2} - s \times \sin(\varphi) \frac{W-1}{2} - s \times \cos(\varphi) \frac{H-1}{2} \end{pmatrix} +$$

$$\begin{pmatrix} s \times \cos(\varphi)^2 - 1 & -s \times \sin(\varphi)^2 \\ s \times \sin(\varphi) & s \times \cos(\varphi) - 1 \end{pmatrix} \begin{pmatrix} i \\ j \end{pmatrix}.$$

By identification and without forgetting the transformation P to be applied to each change of level in the pyramid, we have:

$$\begin{cases} a_1^{opt} = \dfrac{\left(\frac{W-1}{2}\left(1 + \frac{\tan(\psi)}{\tan\left(\frac{\alpha_\psi}{2}\right)} - s \times \cos(\varphi)\right) + \frac{H-1}{2} s \times \sin(\varphi)\right)}{2^{L-1}} & \text{(Formula 2)} \\ a_2^{opt} = s \times \cos(\varphi) - 1 \\ a_3^{opt} = -s \times \sin(\varphi) \\ a_4^{opt} = \dfrac{\left(\tan(\theta) \times \sqrt{\frac{(H-1)^2}{4\tan^2\left(\frac{\alpha_\theta}{2}\right)^2} + \frac{(W-1)^2}{4} \frac{\tan(\psi)^2}{\tan\left(\frac{\alpha_\psi}{2}\right)^2}} - \frac{W-1}{2} s \times \sin(\varphi) + \frac{H-1}{2}(1 - s \times \cos(\varphi))\right)}{2^{L-1}} \\ a_5^{opt} = s \times \sin(\varphi) \\ a_6^{opt} = s \times \cos(\varphi) - 1 \end{cases}$$

With these principles exposed, the steps 102_1 and 102_2 of the set of steps 102 are now described.

For level L−1, in an initial vector determination substep 102_1, the initial vector $X_0^{opt}$ is taken equal to $X_0^{opt} = (a_1^{opt}, a_2^{opt}, a_3^{opt}, a_4^{opt}, a_5^{opt}, a_6^{opt})^T$ with the values of these coefficients defined above, in Formula 2.

In a substep 102_2, for level L−1, recursive calculations, for example according to Gauss Newton are implemented, starting from the initial vector $X_0^{opt}$ determined in step 102_1.

When the recursive Gauss-Newton calculations are completed, the algorithm has, at this level n=L−1 of the pyramid, an estimate $\tilde{X}^L$ of the displacement vector $X^L$ between the two current images of the two pyramids.

Then, to go down in the pyramids and thus refine and converge to a more accurate estimate of X, it is necessary to transform the estimate $\hat{X}^L$ in order to make it go "to the lower level" in the pyramids.

The transformation P to be applied to $\hat{X}^L=(\hat{a}_1^L,\hat{a}_2^L,\hat{a}_3^L, \hat{a}_4^L,\hat{a}_5^L,\hat{a}_6^L)^T$ is the following:

$$\hat{X}^{L-1} = P(\hat{X}^L) = \begin{pmatrix} 2 \times \hat{a}_1^L \\ \hat{a}_2^L \\ \hat{a}_3^L \\ 2 \times \hat{a}_4^L \\ \hat{a}_5^L \\ \hat{a}_6^L \end{pmatrix}.$$

Once this transformation P is done, it is necessary to start again at the lower level, i.e., at the L−2 level (with thus more resolved images), the set of steps 102, i.e., the recursive calculations of the Gauss Newton type (step 102_2 for the L−2 level), but by taking this time in step 102_1 for the L−2 level, for initial estimate $X_{0\_L-2}=P(\hat{X}^L)$.

This process (102_1 then 102_2) is repeated until the lowest level of the pyramid corresponding to n=0 (which corresponds to the original images $I_1$ and $I_2$), taking for each level, as the initial estimate of the coefficient vector, the transform by P of the estimate of the coefficient vector resulting from the previous level.

The final estimate of the movement $\hat{X}$ between the two images is then obtained, by exiting the set of steps 102 implemented for level 0.

The present invention thus makes it possible to use the camera parameters (angular openings, zoom factor, etc.) and the attitude information of a (for example mini-)inertial unit block coupled to the camera in order to propose a first initialization displacement vector closer to the true solution.

In another embodiment, the electronic processing block 12 is implemented as a programmable logic component, such as an FPGA (Field Programmable Gate Array), or as a dedicated integrated circuit, such as an ASIC (Applications Specific Integrated Circuit).

The present invention applies to any iterative algorithm for estimating the movement between images starting from an initial estimate of the movement: typically, those of the Newton or Gauss-Newton type or gradient descent etc.

In other embodiments, the movement determination unit 3, is not integral with the camera 2 and/or is not a (mini-) inertial unit block, but for example a displacement given by a stepper motor or any other system capable of providing a physical estimate of the cameras displacement.

The invention claimed is:

1. A method for estimating the movement between two images implemented by an electronic processing device, said images being captured using an image capture device, said method comprising the steps of:

collecting data defining each of the two images;
    determining an initialization displacement vector characterizing a displacement between said two images;
    implementing, based on the initialization displacement vector, an iterative algorithm delivering at each iteration an updated displacement vector according to an error function to be minimized between one of the two images and the transform of the other image by a displacement defined by the updated displacement vector;
    collecting information defining the movement of the image capture device between the two images;
    collecting the value of one or more capture parameters of the image capture device used for capturing the two images chosen from an angular opening, a zoom factor and the resolution of the images; and
    determining the initialization displacement vector by projecting, in the image plane of the image capture device, the displacement between the two images calculated depending on the collected information defining the movement of the image capture device between the two images and depending on the value of each capture parameter.

2. The method for estimating the movement between two images according to claim 1, wherein the information defining the movement of the image capture device between the two images is provided by a movement determination device attached to the image capture device.

3. The method for estimating the movement between two images according to claim 1, wherein the initialization displacement vector is taken as equal to $X_0^{opt}=(a_1^{opt},a_2^{opt},a_3^{opt},a_4^{opt},a_5^{opt},a_6^{opt})^T$, wherein $$\begin{cases} a_1^{opt} = \dfrac{\left(\dfrac{W-1}{2}\left(1+\dfrac{\tan(\psi)}{\tan\left(\dfrac{\alpha_\psi}{2}\right)} - s \times \cos(\varphi)\right) + \dfrac{H-1}{2} s \times \sin(\varphi)\right)}{2^{L-1}} \\ a_2^{opt} = s \times \cos(\varphi) - 1 \\ a_3^{opt} = -s \times \sin(\varphi) \\ a_4^{opt} = \dfrac{\left(\tan(\theta) \times \sqrt{\dfrac{(H-1)^2}{4\tan\left(\dfrac{\alpha_\theta}{2}\right)^2} + \dfrac{(W-1)^2}{4}\dfrac{\tan(\psi)^2}{\tan\left(\dfrac{\alpha_\psi}{2}\right)^2}} - \dfrac{W-1}{2} s \times \sin(\varphi) + \dfrac{H-1}{2}(1-s \times \cos(\varphi))\right)}{(2^{L-1})} \\ a_5^{opt} = s \times \sin(\varphi) \\ a_6^{opt} = s \times \cos(\varphi) - 1 \end{cases},$$

wherein L is the number of levels of a successive image resolution reduction pyramid in the case of a multi-resolution the movement estimation method or is equal to 1 otherwise; ($\psi$, $\theta$, $\varphi$,) are the Euler angles indicated by the collected information, further representing the rotation of a camera about its line of sight, the images having pixels in width and pixels in height wherein $$\tan\left(\frac{\alpha_\psi}{2}\right), 4\tan\left(\frac{\alpha_\theta}{2}\right)^2,$$

and $$\tan\left(\frac{\alpha_\psi}{2}\right)^2$$

are each non-zero.

4. A non-transitory computer-readable medium comprising a computer program comprising software instructions which, when executed by a computer, implement a method according to claim 1.

5. An electronic device for estimating the movement between two images comprising an input for collecting data defining each of the two images and being adapted to determine an initialization displacement vector characterizing a displacement between said two images and for implementing, based on the initialization displacement vector, an iterative algorithm delivering at each iteration an updated displacement vector depending on an error function to be minimized between one of the two images and the transform of the other image by a displacement defined by the updated displacement vector, said device adapted to collect information defining the movement of the image capture device between the two images, to collect the value of capture one or more parameters of an image capture device used for capturing the two images chosen from an angular opening, a zoom factor and the resolution of the images, and for determining the initialization displacement vector by projecting into the image plane of the image capture device the displacement between the two images calculated, depending on the collected information defining the movement of the image capture device between the two images and depending on the value of each capture parameter.

6. The electronic device for estimating the movement between two images according to claim 5, adapted to take the initialization displacement vector as equal to $X_0^{opt} = (a_1^{opt}, a_2^{opt}, a_3^{opt}, a_4^{opt}, a_5^{opt}, a_6^{opt})^T$, wherein $$\begin{cases} a_1^{opt} = \dfrac{\left(\dfrac{W-1}{2}\left(1 + \dfrac{\tan(\psi)}{\tan\left(\frac{\alpha_\psi}{2}\right)} - s \times \cos(\varphi)\right) + \dfrac{H-1}{2} s \times \sin(\varphi)\right)}{2^{L-1}} \\ a_2^{opt} = s \times \cos(\varphi) - 1 \\ a_3^{opt} = -s \times \sin(\varphi) \\ a_4^{opt} = \dfrac{\left(\tan(\theta) \times \sqrt{\dfrac{(H-1)^2}{4\tan\left(\frac{\alpha_\theta}{2}\right)^2} + \dfrac{(W-1)^2}{4} \dfrac{\tan(\psi)^2}{\tan\left(\frac{\alpha_\psi}{2}\right)^2}} - \dfrac{W-1}{2} s \times \sin(\varphi) + \dfrac{H-1}{2}(1 - s \times \cos(\varphi))\right)}{(2^{L-1})} \\ a_5^{opt} = s \times \sin(\varphi) \\ a_6^{opt} = s \times \cos(\varphi) - 1 \end{cases},$$

wherein L is the number of levels of a successive image resolution reduction pyramid in the case of a multi-resolution the movement estimation method or is equal to 1 otherwise; ($\psi$, $\theta$, $\varphi$,) are the Euler angles indicated by the collected information, $\varphi$ further representing the rotation of a camera about its line of sight, the images having W pixels in width and H pixels in height, wherein $$\tan\left(\frac{\alpha_\psi}{2}\right), 4\tan\left(\frac{\alpha_\theta}{2}\right)^2,$$

and $$\tan\left(\frac{\alpha_\psi}{2}\right)^2$$

are each non-zero.

* * * * *